United States Patent [19]

Eck et al.

[11] 4,365,040
[45] Dec. 21, 1982

[54] AQUEOUS PLASTIC DISPERSIONS OF UNSATURATED DIACETYLACETIC ESTER

[75] Inventors: Herbert Eck; Robert Singer, both of Burghausen, Fed. Rep. of Germany

[73] Assignee: Wacker-Chemie GmbH, Munich, Fed. Rep. of Germany

[21] Appl. No.: 192,732

[22] Filed: Oct. 1, 1980

[30] Foreign Application Priority Data

Nov. 27, 1979 [DE] Fed. Rep. of Germany ....... 2947768

[51] Int. Cl.³ .................... C08F 220/26; C08F 220/10
[52] U.S. Cl. ..................................... 524/819; 524/823; 524/829; 524/832; 524/833
[58] Field of Search ................. 260/29.6 RW, 29.6 H, 260/29.6 AN, 29.6 R; 524/819, 823, 829, 832, 833

[56] References Cited

U.S. PATENT DOCUMENTS 3,145,194 8/1964 Heckmaier ............................ 526/93
4,138,393 2/1979 Lindner ............................... 526/287

FOREIGN PATENT DOCUMENTS 2321254 11/1974 Fed. Rep. of Germany ...... 526/316
2628760 1/1978 Fed. Rep. of Germany ...... 526/316
1213255 11/1970 United Kingdom ................ 526/316
1541908 3/1979 United Kingdom ................ 526/316
1541909 3/1979 United Kingdom ................ 526/316

Primary Examiner—C. A. Henderson
Attorney, Agent, or Firm—Hammond & Littell, Weissenberger and Muserlian

[57] ABSTRACT

Strongly adhering aqueous plastic dispersions based on copolymers of olefinically unsaturated compounds, which are particularly suitable as binding agents for paints and lacquers and as adhesives, and which are distinguished by their good wet adhesion are described. This is achieved by the inclusion by polymerization of from 0.2% to 7% by weight, based on the total weight of the monomers, of vinyl and/or allyl diacetylacetate having the formula:

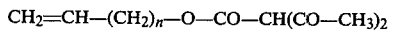

$$CH_2=CH-(CH_2)_n-O-CO-CH(CO-CH_3)_2$$

wherein n is 0 or 1, in the production of copolymers of the invention in an aqueous emulsion.

6 Claims, No Drawings

AQUEOUS PLASTIC DISPERSIONS OF UNSATURATED DIACETYLACETIC ESTER

BACKGROUND OF THE INVENTION

The invention concerns aqueous plastic dispersions, which are advantageously used as binding agents for paints and lacquers and also as adhesives, and are distinguished by their strong adherence, when wet, to smooth non-absorbent substrates. The invention also concerns a process for the manufacture of these dispersions and their use.

Hitherto, the use of many types of dispersion paints on smooth nonabsorbent substrates has been considerably limited on account of their poor adhesion when wet. The problem is particularly difficult when fresh painting is carried out with low-pigment dispersion paints, which, because of their high binder content, are used particularly when the paint is to be resistant to washing off.

Various proposals have been made, for example, in German Published Application Nos. DE-OS 25 35 373, DE-OS 25 35 374 and DE-OS 26 28 760, for reducing or avoiding these difficulties, which can be further increased, in particular, by the addition of flow-promoting agents, such as ethylene glycol, propylene glycol, etc. These proposals involve the inclusion by copolymerization, of vinyl acetoacetate or allyl acetoacetate or acetoacetic acid esters having the general formula:

R—CH=C(R)—CO—O—A—CO—CH$_2$—CO—CH$_3$ in which R denotes H, CH$_3$— and A denotes —(CH$_2$)$_{1-4}$—O— or —(CH$_2$—CH$_2$)$_{1-3}$—O—.

The improvement so achieved is still not sufficient for many applications. There has, therefore, existed the problem of improving the adhesion, when wet, of plastic dispersions, having high wash-off resistance, suitable for the production of dispersion paints.

OBJECTS OF THE INVENTION

An object of the present invention is the development of aqueous plastic dispersions which are strongly adherent, when wet, to smooth nonabsorbent substrates.

Another object of the present invention is the development of a strongly adherent aqueous plastic dispersion comprised of copolymers of olefinically unsaturated compounds and containing from 0.2% to 7% by weight, based on the total weight of the copolymer, of diacetylacetic acid ester units, having the formula:

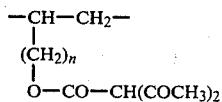

wherein n is the integer 0 or 1, copolymerized therein.

A further object of the present invention is the development of a process for the production of the above strongly adherent aqueous plastic dispersion consisting of the steps of copolymerizing olefinically unsaturated compounds in an aqueous emulsion in the presence of a free-radical initiator, an emulsifier and, optionally, a protective colloid and/or conventional additives, said copolymerization charge containing from 0.2% to 7% by weight, based on the total weight of monomers, of a diacetylacetic acid ester having the formula:

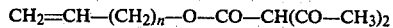

wherein n is the integer 0 or 1, and recovering said strongly adherent aqueous plastic dispersion.

A yet further object of the present invention is the use of the above strongly adherent aqueous plastic dispersions containing diacetylacetic acid ester units as binding agent in paints and lacquers.

These and other objects of the present invention will become more apparent as the description thereof proceeds.

DESCRIPTION OF THE INVENTION

It has now been found that the problems of the prior art have been overcome and the above objects achieved by aqueous plastic dispersions of copolymers of olefinically unsaturated compounds containing from 0.2% to 7% by weight, preferably from 0.2% to 5% by weight, based on the weight of the copolymer, of diacetylacetic acid ester units, having the general formula:

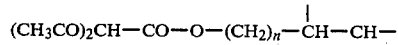

in which n denoted 0 and/or 1, copolymerized therein.

Copolymers containing the above-mentioned diacetylacetic acid ester units are surprisingly found to be superior to those which contain acetoacetic acid ester units, even when the molar quantities of the diacetylacetic acid and acetoacetic acid ester units are the same. It, therefore, often suffices merely to include up to 4% by weight of these units.

This finding is particularly surprising since it is known that the second acetyl group, located on the α-carbon atom of the acetoacetic acid ester, is very readily hydrolyzed during the handling of diacetylacetic acid esters. It would, therefore, have been expected that one of the two acetyl groups of the above-mentioned diacetylacetic acid ester units, copolymerized in said aqueous plastic dispersion, would hydrolyze, and that, therefore, at best the result disclosed in the above-mentioned prior publications would have been achieved.

Surprisingly, split-off acetic acid could not be detected even after more than six months' storage of the aqueous plastic dispersions according to the invention.

The aqueous plastic dispersions of the invention can be produced by the copolymerization of olefinically unsaturated compounds in an aqueous emulsion in the presence of a free-radical initiator, an emulsifier and, optionally, a protective colloid and/or conventional additives. The method consists of simultaneously copolymerizing from 0.2% to 7% by weight, preferably from 0.2% to 5% by weight, and especially up to 4% by weight, based in each case on the total weight of the monomers, of a diacetylacetic acid ester or esters of the general formula:

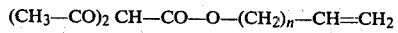

in which n denotes 0 and/or 1.

The olefinically unsaturated compounds used may be all of those which have been previously used for producing plastic dispersions for low-pigment-content dispersion paints.

Examples that might be mentioned here are vinyl esters of organic carboxylic acids, the carbon skeleton of which contains 1 to 20 carbon atoms, esters of acrylic or methacrylic acid with $C_1$ to $C_{20}$-alcohols, aliphatic or, preferably, aromatic $\alpha,\beta$-unsaturated hydrocarbons, diesters of maleic acid or fumaric acid, and $\alpha,\beta$-unsaturated carboxylic acids and their derivatives, e.g., amides, nitriles and vinyl halides.

More particularly, therefore, the present invention relates to a strongly adherent aqueous plastic dispersion consisting essentially of from 20% to 70% by weight of copolymers of at least two olefinically unsaturated compounds selected from the group consisting of:

(1) vinyl esters of alkanoic acids having from 1 to 20 carbon atoms,
(2) (meth)acrylic acid esters with alkanols having from 1 to 20 carbon atoms,
(3) $\alpha,\beta$-alkenes having 2 to 6 carbon atoms,
(4) $\alpha,\beta$-alkenyl-aromatic hydrocarbons having 8 to 14 carbon atoms,
(5) maleic and fumaric acid diesters with alkanols having from 1 to 12 carbon atoms,
(6) $\alpha,\beta$-unsaturated alkenoic acids having from 3 to 7 carbon atoms,
(7) amides of said alkenoic acids,
(8) nitriles of said alkenoic acids, and
(9) vinyl halides, said copolymers containing from 0.2% to 7% by weight of diacetylacetic acid ester units having the formula:

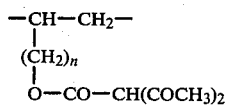

wherein n is the integer 0 or 1, and from 0 to 5% by weight of polyfunctional monomers capable of cross-linking copolymers, in an aqueous dispersion.

Among the above olefinically unsaturated compounds utilized in preparing the copolymers, the following are preferred: vinyl acetate, vinyl propionate, vinyl isononanoate, vinyl laurate, vinyl Versatate®, methyl acrylate, ethyl acrylate, butyl acrylate, 2-ethylhexyl acrylate, styrene, vinyl toluene, dibutyl maleate, di(2-ethylhexyl) fumarate, acrylic acid, crotonic acid, methacrylic acid, acrylamide, methacrylamide, acrylonitrile and vinyl chloride.

The following specially preferred monomer combinations may also be mentioned:
butyl acrylate/methyl methacrylate/acrylic acid/acrylamide/allyl diacetylacetate,
2-ethylhexyl acrylate/butyl acrylate/acrylic acid/acrylamide/allyl diacetylacetate,
styrene/methyl acrylate/acrylic acid/acrylamide/allyl diacetylacetate,
styrene/butyl acrylate/diethylhexyl fumarate/acrylic acid/acrylamide/allyl diacetylacetate,
vinyl acetate/vinyl esters of $\alpha$-branched carboxylic acids (Versatic® esters-registered trademark of Shell)/allyl diacetylacetate,
vinyl acetate/vinyl esters of the above-mentioned branched carboxylic acids/butyl acrylate/vinyl diacetylacetate,
vinyl acetate/vinyl chloride/allyl diacetylacetate,
vinyl acetate/ethylene/allyl diacetylacetate, and
vinyl chloride/butyl acrylate/allyl diacetylacetate.

Of course, in the above, mixtures of vinyl diacetylacetate and allyl diacetylacetate may also be employed.

In addition to the above-mentioned olefinically unsaturated compounds, polyfunctional monomers which permit cross-linking of the polymers may also be used concomitantly. Examples of such monomers are esters of unsaturated carboxylic acids with alcohols containing functional groups, such as glycidyl alcohol, such compounds being glycidyl (meth)acrylate; esters of unsaturated carboxylic acids with polyfunctional alcohols, such as ethylene glycol, propylene glycol and butylene glycol, vinyl and allyl compounds of, for example, silanes, glycidyl alcohol, glycols, aminoalcohols, aliphatic $\alpha$-chlorocarboxylic acids, dichlorotriazines; as well as silyl derivatives of $\alpha,\beta$-unsaturated carboxylic acids, the silyl group of which carries further functional groups, for example, acryltrialkoxysilane. The amount of optionally employed polyfunctional monomers may amount to 0 to 5%.

The aqueous plastic dispersions in accordance with the invention are produced in known manner by copolymerization, in a continuous or discontinuous manner, in aqueous emulsion in the presence of a free-radical initiator, an emulsifier and, optionally, a protective colloid and/or conventional additives.

The free-radical initiators used may be the radical catalyst systems hitherto used in conventional emulsion polymerization processes, for example, water-soluble peroxidic and diazo compounds, such as ammonium persulfate, potassium persulfate, ammonium peroxydisulfate, potassium peroxydisulfate, tert-butyl hydroperoxide, hydrogen peroxide, and peroxydiphosphate, such as potassium, sodium and ammonium peroxydiphosphate, optionally together with reducing agents. Examples of such reducing agents are sodium sulfite, sodium bisulfite, sodium dithionite, zinc formaldehyde sulfoxylate and sodium formaldehyde sulfoxylate. Also suitable are hydrogen/noble metal catalysts with the simultaneous use of small quantities of heavy metal salts as activators (DE-PS 11 33 130). Polymerization with the known redox catalyst systems is generally preferred. Such suitable redox catalyst systems are described, among other places, in "Fundamental Principles of Polymerization," by G. F. Alelio, John Wiley and Sons, Inc., New York, 1952, pages 333 et seq.

Reducing and oxidizing agents can be metered in during the reaction, but it is also possible to start with one of the two components and meter in the other. Generally, approximately from 0.01% to 0.5% by weight, preferably from 0.03% to 0.3% by weight, of reducing agent and from 0.01% to 2% by weight, preferably from 0.03% to 0.8% by weight, of oxidizing agent are required, these values in each case being based on the total weight of the monomers. It is often of advantage to use oxidation and reducing agents in stoichiometric quantities, or to use the oxidizing agent in an excess of up to six-fold.

Copolymerization in accordance with the invention is generally preferably carried out at pH values of between 2.5 and 7. However, values lower or greater than these can be used. The pH value can initially be set by means of small quantities of acids or bases. It is often advantageous to add buffer substances, for example, sodium bicarbonate and ammonium bicarbonate, borax, sodium acetate and sodium citrate, as well as mixtures of primary and secondary alkali metal phosphates.

The emulsifiers used may be nonionic or anionic surface-active compounds, added separately or as a mixture, for example, alkali metal or alkaline earth metal salts of alkylated benzenesulfonic acid and alkylated naphthalenesulfonic acid, such as sodium tolylsulfonate, alkali metal alkyl sulfonates, such as sodium lauryl sulfonate, salts of alkylsulfuric acids, such as sodium lauryl sulfate, sodium alkylsulfosuccinate, sodium alkylsulfosuccinate semi-esters and full esters, sodium and ammonium salts of sulfate esters of alkylphenoxy poly(ethoxy)ethanols, such as octylphenoxy and isononylphenoxy poly(ethoxy) ethanols, their ethoxylated products, ethylene oxide adducts onto alcohols, such as alkylene glycols and alkyl phenols, block copolymers of ethylene oxide and propylene oxide, sulfonated fatty acid amides, fatty alcohol/ethylene oxide addition products and fatty amine/ethylene oxide addition products.

The emulsifiers are added to the monomer dispersion preferably in quantities of between 0.5% to 10% by weight.

Protective colloids, which may be added are, for example, natural substances, such as gum arabic, starch, alginates; modified natural substances, such as methylcellulose, ethylcellulose, hydroxyalkylcellulose and carboxymethylcellulose; synthetic substances, such as polyvinyl alcohols, partially saponified polyvinyl acetate, polyvinyl pyrrolidone; and mixtures of such substances. The modified cellulose derivatives and the synthetic protective colloids are preferred.

The dispersions according to the invention are generally produced with solids contents of from 20% to 70% by weight, preferably from 40% to 60% by weight, based on the total weight. If required, they may also be mixed with other dispersions, but in general they will be used alone.

Preferably the aqueous plastic dispersions of the invention have a minimum film-forming temperature of +65° C. or below, down to −30° C., preferably from 50° C. to −15° C., especially preferably from 20° C. to −10° C.

The latexes according to the invention are suitable, for example, as adhesives for coating paper, woven materials, such as textiles and fiberglass, and for the coating of wood, cardboard, asbestos cement products, cement products, and as binders in paint mixtures and mortar mixtures.

The plastic dispersions according to the invention are preferably used in dispersion paints having preferably approximately 5% to 30% by weight of pigment. These dispersion paints yield coats of paint that are particularly resistant to being washed off, even when organic solvents, particularly polyfunctional alcohols, such as glycols, are added to these paints as flow-promoting agents for better performance.

Apart from ethylene glycol and propylene glycol, the organic solvents of this kind that can be used are butylene glycol, hexylene glycol, oligoglycols, such as diethylene-glycol or tri-ethylene-glycol, glycol ethers and oligoglycol ethers, such as methyl, ethyl, propyl, and butyl (mono-, di- and tri)-ethylene-glycol ethers, (mono-, di- and tri)-glycol esters, such as (mono-, di- and tri)-ethylene-glycol acetate, propionate and butyrate, glycol and oligoglycol semi-ether semi-esters, such as methyl, ethyl, propyl and butyl (mono-, di- and tri)-ethylene-glycol acetate, propionate and butyrate, or mixtures thereof.

The organic solvents are, in many cases, added to the dispersion paint in quantities of from 3% to 30% by weight, preferably 5% to 15% by weight, based on the total weight of the paint.

The following examples will serve to explain the invention in more detail without being considered limitative.

EXAMPLES

Emulsifier A = nonylphenol polyglycol ether with approximately 30 ethylene oxide units (Antarox ® CO 880).

Emulsifier B = nonylphenol polyglycol ether with approximately 15 ethylene oxide units (Genapol ® X 150).

Emulsifier C = sodium isotridecyl sulfonate (Mersolate ® K 30).

EXAMPLES 1 AND 2 AND COMPARATIVE TESTS A TO D 60 gm of a 30% by weight aqueous solution of Emulsifier A, 333 gm of a 3.6% by weight sodium vinyl sulfonate solution, 1.5 gm of sodium acetate and 2.5 gm of ammonium persulfate were stirred in and dissolved in 290 gm of deionized water. Approximately 10% by weight of the monomers shown in Table 1 were then emulsified in this mixture. Polymerization was initiated by raising the temperature to approximately 70° to 80° C. The remaining monomers were then added in measured amounts over a period of approximately three hours in a continuous manner as they were consumed. When polymerization was complete, the mixture was cooled and analyzed (Table 1).

EXAMPLES 3 AND 4 AND COMPARATIVE TESTS E TO H 6 gm of a 30% by weight sodium isotridecyl sulfonate solution were stirred in 330 gm of deionized water. Following heating to 80° C., a preliminary emulsion was continuously added in measured amounts over a period of two hours. This emulsion had been produced from 550 gm of deionized water, 5 gm of a 30% by weight sodium isotridecyl sulfonate solution, 9 gm of acrylic acid, 18 gm of acrylamide, 4.5 gm of ammonium persulfate, and the monomer mixture shown in Table 2. The properties of the plastic dispersions so produced are indicated in Table 2.

TABLE 1

| Comparative Tests & Examples | Vinyl Acetate gm | VV 10 gm | AAcAc gm | ADAcAc gm | BAr gm | CA gm | SC % | MFT °C. | K-Value | Adherence To Glass (24 h water unpigmented film) | Leneta foil (24 h water pigm. film) | Alkyd Adhesion (wet adhesion) matt | bright |
|---|---|---|---|---|---|---|---|---|---|---|---|---|---|
| A | 480 | 120 | — | — | — | — | 47.5 | 15 | 48 | 4 | 2 | 3 | 3 |
| B | 480 | 120 | 9 | — | — | — | 47.5 | 16 | 84* | 5 | 3 | 3 | 2 |
| 1 | 480 | 120 | — | 9 | — | — | 47.9 | 15 | 77 | 4 | 1 | 1 | 2 |

TABLE 1-continued

| Comparative Tests & Examples | Vinyl Acetate gm | VV 10 gm | AAcAc gm | ADAcAc gm | BAr gm | CA gm | SC % | MFT °C. | K-Value | Adherence To Glass (24 h water unpigmented film) | Adherence To Leneta foil (24 h water pigm. film) | Alkyd Adhesion (wet adhesion) matt | Alkyd Adhesion (wet adhesion) bright |
|---|---|---|---|---|---|---|---|---|---|---|---|---|---|
| C | 396 | 150 | — | — | 48 | 6 | 48 | 12 | 77.5 | 4 | — | 3 | 3 |
| D | 396 | 150 | 18 | — | 48 | 6 | 48.5 | 11 | 96 | 4.5 | — | 1 | 1 |
| 2 | 396 | 150 | — | 18 | 48 | 6 | 48.8 | 12 | 92.5 | 3.5 | — | 1 | 1 |

*Slightly Cloudy
AAcAc = Allyl acetoacetate
ADAcAc = Allyl diacetylacetate
BAr = Butyl acrylate
CA = Crotonic acid
SC = Solids content (% by weight)
MFT = Minimum film-forming temperature
VV 10 = Vinyl ester of a branched carboxylic acid as described (Veo Va 10, Versatic ® acid-10 vinyl ester)

TABLE 2

| Comparative Tests & Example | Butyl Acrylate gm | MMAc gm | Styrene gm | DEHF gm | ADAcAc gm | AAcAc gm | SC % | MFT °C. | K-Value | Alkyd Adhesion (Wet Adhesion) |
|---|---|---|---|---|---|---|---|---|---|---|
| E | 440 | 440 | — | — | — | — | 50 | 15 | 100 | 4 |
| F | 440 | 440 | — | — | — | 18 | 51 | 11 | 98 | 2 |
| 3 | 440 | 440 | — | — | 18 | — | 50 | 12 | 98 | 1 |
| G | 360 | — | 440 | 90 | — | — | 50 | 13 | 52 | 4 |
| H | 360 | — | 440 | 90 | — | 18 | 48 | 11 | 53 | 2 |
| 4 | 360 | — | 440 | 90 | 18 | — | 49 | 13 | 54 | 1 |

The following explains the assessment numerals used in the Table:
1 = very good
2 = good
3 = medium
4 = poor
5 = very poor
6 = detached from plate
+0.5 = blisters at edge
MMAc = Methyl methacrylate
DEHF = Di-2-ethylhexyl fumarate
ADAcAc = Allyl diacetylacetate
AAcAc = Allyl acetylacetate

COMPARATIVE TEST I

100 Parts by weight of deionized water and 0.6 part by weight of potassium persulfate were put into an autoclave, and the pH was adjusted to 3 to 3.5 (formic acid, ammonia). The atmospheric oxygen was displaced by nitrogen. Following evacuation and adjustment of the temperature to 35° C., 18 parts by weight of vinyl acetate were added while being stirred, and ethylene was introduced under pressure up to the equilibrium pressure of 50 bar. Polymerization was initiated and controlled by the addition of approximately 0.8 part by weight per hour of 1% by weight aqueous sodium formaldehyde sulfoxylate solution.

Following commencement of the reaction, 164 parts by weight of vinyl acetate and a solution consisting of 4 parts by weight of Emulsifier B, 0.15 part by weight of Emulsifier C, 0.9 part by weight of sodium vinyl sulfonate, 1.5 parts by weight of acrylamide and 1.5 parts by weight of acrylic acid in 42 parts by weight of deionized water, were simultaneously metered in over a period of approximately six hours. The pH was maintained at 2.6 to 5 by means of ammonia over the entire polymerization time. On completion of polymerization, the pH was adjusted to 7 to 8 with ammonia, and the product was degassed.

The adherence, on glass, of a film dried at 100° C. was mediocre.

EXAMPLE 5

Comparative Test I was repeated, but with the further step that during polymerization, 3.25 parts by weight of allyl diacetylacetate (dissolved in the monomer flow) were also added. The wet adhesion of an unpigmented film on glass was improved, as compared with Test I from 4 to 2-3.

The preceding specific embodiments are illustrative of the practice of the invention. It is to be understood, however, that other expedients known to those skilled in the art or disclosed herein, may be employed without departing from the spirit of the invention or the scope of the appended claims.

We claim:
1. A strongly adherent aqueous plastic dispersion consisting essentially of from 20% to 70% by weight of copolymers of at least two olefinically unsaturated compounds selected from the group consisting of:
(1) vinyl esters of alkanoic acids having from 1 to 20 carbon atoms,
(2) (meth)acrylic acid esters with alkanols having from 1 to 20 carbon atoms,
(3) α,β-alkenes having 2 to 6 carbon atoms,
(4) α,β-alkenyl-aromatic hydrocarbons having 8 to 14 carbon atoms,
(5) maleic and fumaric acid diesters with alkanols having from 1 to 20 carbon atoms,
(6) α,β-unsaturated alkenoic acids having from 3 to 7 carbon atoms,

(7) amides of said alkenoic acids, (8) nitriles of said alkenoic acids, and (9) vinyl halides, said copolymers containing from 0.2% to 7% by weight of diacetylacetic acid ester units having the formula:

$$-CH-CH_2-$$
$$|$$
$$(CH_2)_n$$
$$|$$
$$O-CO-CH(COCH_3)_2$$

wherein n is the integer 0 or 1, and from 0 to 5% by weight of polyfunctional monomers capable of crosslinking copolymers, in an aqueous dispersion.

2. The aqueous plastic dispersion of claim 1 wherein the content of said copolymers was from 40% to 60% by weight.

3. The aqueous plastic dispersion of claim 1 having a minimum film-forming temperature of between −30° C. and 65° C.

4. The aqueous plastic dispersion of claim 1 having a minimum film-forming temperature of between −15° C. and 50° C.

5. A strongly adherent aqueous plastic dispersion consisting essentially of from 20% to 70% by weight of copolymers of at least two olefinically unsaturated compounds selected from the group consisting of:
   (1) vinyl esters of alkanoic acids selected from the group consisting of vinyl acetate, vinyl propionate, vinyl isononanoate, vinyl laurate and vinyl esters of Versatic ® acids,
   (2) (meth)acrylic acid esters with alkanols having from 1 to 20 carbon atoms selected from the group consisting of methyl acrylate, ethyl acrylate, butyl acrylate, 2-ethylhexyl acrylate and methyl methacrylate,
   (3) ethylene,
   (4) styrene and vinyl toluene,
   (5) dibutyl maleate and di(2-ethylhexyl) fumarate,
   (6) acrylic acid, methacrylic acid and crotonic acid,
   (7) acrylamide and methacrylamide,
   (8) acrylonitrile, and
   (9) vinyl chloride, said copolymers containing from 0.2% to 7% by weight of diacetylacetic acid ester units having the formula:

$$-CH-CH_2-$$
$$|$$
$$(CH_2)_n$$
$$|$$
$$O-CO-CH(COCH_3)_2$$

wherein n is the integer 0 or 1, in an aqueous dispersion.

6. A strongly adherent aqueous plastic dispersion consisting essentially of from 20% to 70% by weight of copolymers of at least two olefinically unsaturated compounds selected from the group consisting of:
   (1) vinyl esters of alkanoic acids having from 1 to 20 carbon atoms,
   (2) (meth)acrylic acid esters with alkanols having from 1 to 20 carbon atoms,
   (3) $\alpha,\beta$-alkenes having 2 to 6 carbon atoms,
   (4) $\alpha,\beta$-alkenyl-aromatic hydrocarbons having 8 to 14 carbon atoms,
   (5) maleic and fumaric acid diesters with alkanols having from 1 to 12 carbon atoms,
   (6) $\alpha,\beta$-unsaturated alkenoic acids having from 3 to 7 carbon atoms,
   (7) amides of said alkenoic acids,
   (8) nitriles of said alkenoic acids, and
   (9) vinyl halides, said copolymers containing from 0.2% to 7% by weight of diacetylacetic acid ester units having the formula:

$$-CH-CH_2-$$
$$|$$
$$(CH_2)_n$$
$$|$$
$$O-CO-CH(COCH_3)_2$$

wherein n is the integer 0 or 1, and from 0 to 5% by weight of polyfunctional monomers capable of crosslinking copolymers, in an aqueous dispersion, wherein said at least two olefinically unsaturated compounds and said diacetylacetic acid ester units are mixtures selected from the group consisting of:
   (a) butyl acrylate/methyl methacrylate/acrylic acid-/acrylamide/allyl diacetylacetate,
   (b) 2-ethylhexyl acrylate/butyl acrylate/acrylic acid-/acrylamide/allyl diacetylacetate,
   (c) styrene/methyl acrylate/acrylic acid/acrylamide-/allyl diacetylacetate,
   (d) styrene/butyl acrylate/diethylhexyl fumarate/acrylic acid/acrylamide/allyl diacetylacetate,
   (e) vinyl acetate/vinyl esters of α-branched carboxylic acids/allyl diacetylacetate,
   (f) vinyl acetate/vinyl esters of α-branched carboxylic acids/butyl acrylate/vinyl diacetylacetate,
   (g) vinyl acetate/vinyl chloride/allyl diacetylacetate,
   (h) vinyl acetate/ethylene/allyl diacetylacetate, and
   (i) vinyl chloride/butyl acrylate/allyl diacetylacetate.

* * * * *